(12) United States Patent
Westwater et al.

(10) Patent No.: US 10,419,771 B2
(45) Date of Patent: Sep. 17, 2019

(54) METHOD AND SYSTEM FOR IMPROVED IMAGE COMPRESSION

(71) Applicant: ZPEG, Inc., Austin, TX (US)

(72) Inventors: Raymond J. Westwater, Austin, TX (US); Jeffrey S. Perry, Austin, TX (US)

(73) Assignee: ZPEG, Inc., Austin, TX (US)

( * ) Notice: Subject to any disclaimer, the term of this patent is extended or adjusted under 35 U.S.C. 154(b) by 117 days.

(21) Appl. No.: 15/427,570

(22) Filed: Feb. 8, 2017

(65) Prior Publication Data

US 2018/0227587 A1     Aug. 9, 2018

(51) Int. Cl.
| | |
|---|---|
| *H04N 19/176* | (2014.01) |
| *H04N 19/426* | (2014.01) |
| *H04N 19/85* | (2014.01) |
| *H04N 19/167* | (2014.01) |
| *H04N 19/182* | (2014.01) |
| *H04N 19/80* | (2014.01) |
| *H04N 19/117* | (2014.01) |
| *H04N 19/17* | (2014.01) |
| *H04N 19/86* | (2014.01) |

(52) U.S. Cl.
CPC ......... *H04N 19/426* (2014.11); *H04N 19/117* (2014.11); *H04N 19/167* (2014.11); *H04N 19/17* (2014.11); *H04N 19/176* (2014.11); *H04N 19/182* (2014.11); *H04N 19/80* (2014.11); *H04N 19/85* (2014.11); *H04N 19/86* (2014.11)

(58) Field of Classification Search
None
See application file for complete search history.

(56) References Cited

U.S. PATENT DOCUMENTS

| | | | |
|---|---|---|---|
| 6,546,054 B1* | 4/2003 | Kawada | H04L 1/06 375/240.28 |
| 9,955,160 B1* | 4/2018 | Yadav | H04N 19/117 |
| 10,158,870 B2* | 12/2018 | Jeong | H04N 19/61 |
| 2008/0056389 A1 | 3/2008 | Chiang et al. | |
| 2010/0104027 A1* | 4/2010 | Youn | H04N 19/176 375/240.29 |
| 2010/0290528 A1 | 11/2010 | Chengalvala et al. | |
| 2011/0051804 A1* | 3/2011 | Chou | H04N 19/117 375/240.03 |
| 2013/0051694 A1* | 2/2013 | Ayzenberg | H04N 19/117 382/250 |
| 2013/0113884 A1 | 5/2013 | Leontaris et al. | |
| 2013/0251245 A1* | 9/2013 | Porikli | H04N 19/86 382/159 |

(Continued)

OTHER PUBLICATIONS

The PCT Search Report and Written Opinion dated Apr. 24, 2018, PCT Application No. PCT/US18/16984, 13 pages.

*Primary Examiner* — Jayanti K Patel
*Assistant Examiner* — Shadan E Haghani
(74) *Attorney, Agent, or Firm* — Lee & Hayes, P.C.

(57) ABSTRACT

A system configured to perform pre-processing on a plurality of frames representative of an image, such as frames of a video sequences, to improve the compressibility of the video sequence during video encoding. In some cases, the plurality of frames are utilized to generate a deblocked image that may be compressed by the video encoder to further improve compression rates with respect to the original video sequence.

20 Claims, 11 Drawing Sheets

(56) References Cited

U.S. PATENT DOCUMENTS

| | | | |
|---|---|---|---|
| 2014/0285623 A1* | 9/2014 | Bruls | G06T 5/002 |
| | | | 348/43 |
| 2015/0016535 A1* | 1/2015 | Piao | H04N 19/96 |
| | | | 375/240.16 |
| 2015/0206287 A1* | 7/2015 | Wang | G06T 3/4015 |
| | | | 382/275 |
| 2018/0205964 A1* | 7/2018 | Mukherjee | H04N 19/105 |

* cited by examiner

METHOD AND SYSTEM FOR IMPROVED IMAGE COMPRESSION

BACKGROUND

Conventional compression systems, often perform pre-processing on visual data to remove undesirable noise from video or image sources prior to compressing the data. In some case, block based pre-processing may be performed to improve the overall compression associated with the visual data when compared to compression of non-processed visual data. However, the act of blocking in conventional systems often introduces edge effects or imperceptible irregularities that are not detectable by the human eye. Unfortunately, the imperceptible irregularities effectively introduce additional data prior to encoding that ultimately reduces a realized compression rate with respect to the visual data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Introduction

This disclosure includes techniques and implementations for deblocking of image data, including spatiotemporal three-dimensional video sequences, to improve effective compressing rates realized by a video encoder. For example, image data is often pre-processed prior to compressing by a video encoder to improve the compression rate of the image data when compared with a non-processed image. However, many conventional systems utilize block based pre-processing systems that introduce imperceptible irregularities (e.g., data not noticeable or detectable by the human eye) along the edge of the blocks. The pre-processed image data including the imperceptible irregularities are then encoded and transmitted to a receiver (such as a set-top-box). Unfortunately, in the conventional system, the encoding of the imperceptible irregularities results in a reduction in the overall compression of the image data, increasing bandwidth usage, and overall costs associated with transmitting data. Thus, described herein, is a system and techniques to remove the imperceptible irregularities using deblocking on the pre-processed image data prior to compression by the encoder.

For example, in one implementation, the image data may be provided to the pre-processor to improve the overall compression rate of the image data. The pre-processed data may then be deblocked either by the pre-processor or by the encoder prior to compressing. In some cases, the deblocking may include receiving a plurality of planes, each representative of at least a portion of the image data. In one example, each plane may be offset from a top left corner of the image, designated at (0,0), by X and Y coordinate combinations formed based on a predetermined offset value. For instance, one possible series of offsets for an 8×8 image with a preprocess that utilizes a block size of 4×4 may be based on a predetermined offset value of two (e.g., half the block size). In this example, the offset values for X and Y may be (0,0), (2,0), (0,2), and (2,2).

In another specific example, the number of planes for an image may set to four. In this example, the offset may be based on a value other than half the block size as discussed above. For instance, the plane size may be based on the size of the predetermined offset value and the size of the plane. Thus, if the image has a size of ten by ten and the predetermined offset value of two, the plane size may be set to eight by eight and the coordinates of each plane offset from (0,0) at the top left corner may be (0,0), (0,2), (2,0), and (2,2). Using these offset coordinates for the top left corner of each plane having a size of eight by eight (e.g., the size of the image minus the offset value), results in four overlapping planes in which none of the interior pixels of the image are boundary pixels for all of the planes (e.g., each interior pixel of the image is also an interior pixel for at least one of the planes).

For example, in one implementation, the image data may be provided to the pre-processor to improve the overall compression rate with respect to the original image data. The pre-processed data may then be deblocked either by the pre-processor or by the encoder prior to compressing. In one particular example, the deblocking unit may receive a single plane representing at least a portion of the image to be deblocked, and may or may not carry associated data indicating the size and alignment of a plurality of processed blocks comprising the plane. In this case, other deblocking methods may be employed to determine block boundaries and remove pre-processing edge artifacts, rendering the plane more compressible.

In another specific example, the number of planes for an image may set to four and the offset set to half the block size. For instance, if the image has a size of eight by eight and the predetermined offset value of four, the planes may be offset by X, Y values of (0,0), (0,2), (2,0), and (2,2), as discussed above. However, in this example, the boundary pixels may be ignored as in some systems (e.g., video processing systems) boundary pixels may not affect the compressibility of the image, as some types of pre-processing, such as motion estimation, do not extend outside the boundary of the image. Thus, in this example, the blocks for the plane at (0,0) may be four by four, the blocks for the plane at (0,2) may be four by four or four by two, the blocks for the plane at (2,0) may be two by four or four by four, and the blocks for the plane at (2,2) may be two by two, two by four, four by four, or four by two. Again in this example, the blocks of each of the four planes overlap such that none of the interior pixels of the image are boundary pixels for all of the blocks over all of the planes (e.g., each interior pixel of the image is also an interior pixel for at least one block within at least one plane).

In yet another specific example, the number of planes for an image may set to four. In this example, the plane size may be based on the size of the predetermined offset value and the size of a padded version of the original image. Unlike the example above, in this case, the padding may cause boundary pixels of the original image to be interior pixels of at least one block of at least one plane. For example, the pre-processor may extend or shift the image by mirroring the edges pixels or padding the original image. For instance, the padding may be equal to half a block size or in this case of a block size of 4×4, the padding may add two additional pixels around the exterior of the original image. Thus, if the original image has a size of eight by eight and the pre-process has a block size of 4×4, the top left corner of a block within each plane offset from (0,0) of the original image may be (−2,−2), (−2,0), (0,−2), and (0,0). Thus, by extending the planes beyond the boundary of the original image, the four planes overlap such that none of the interior pixels nor the exterior pixels of the original image are boundary pixels for all of the blocks over all of the planes (e.g., each pixel of the original image is also an interior pixel for at least one block of at least one plane).

Example Implementations

Figure 1:
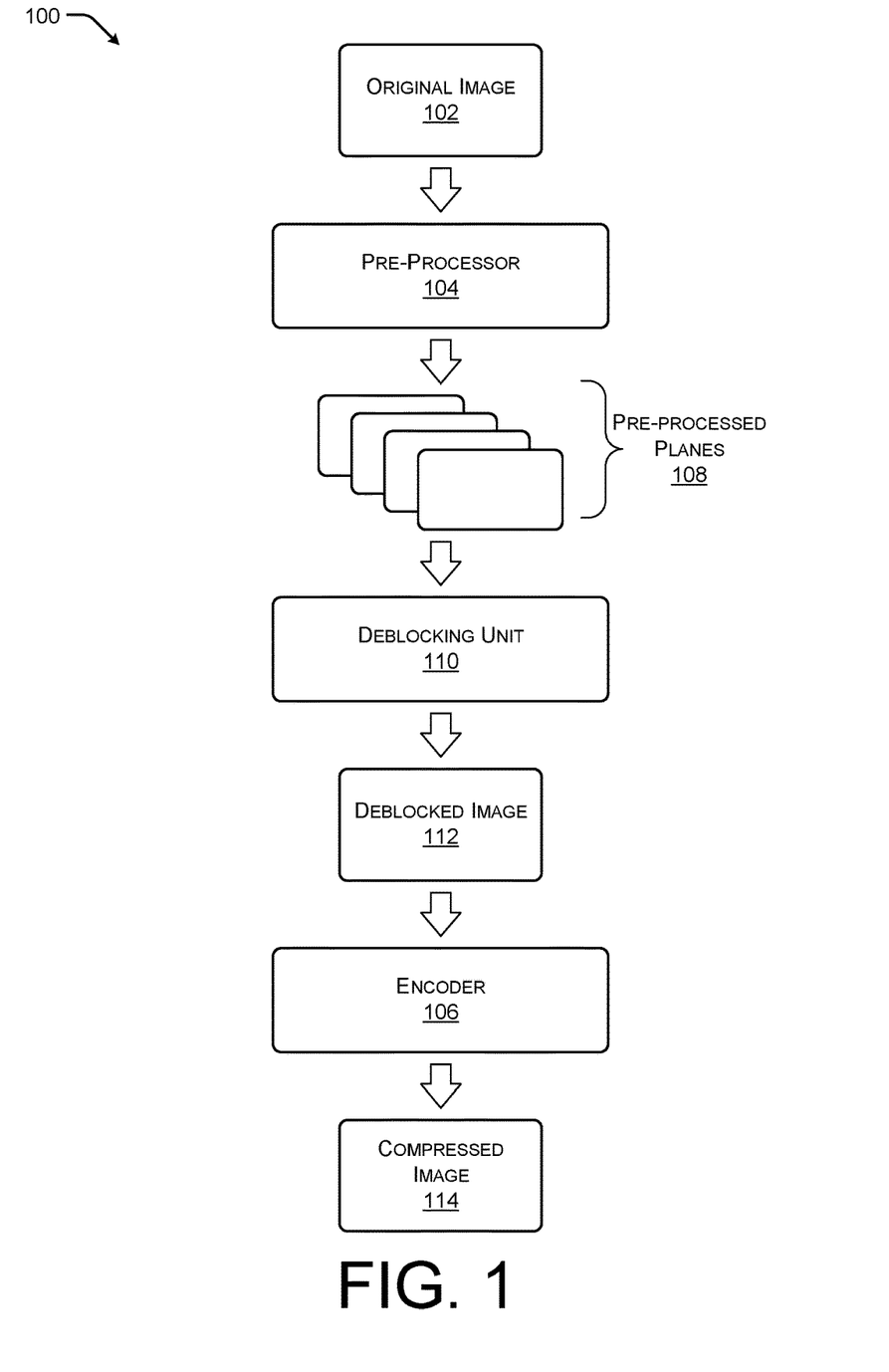
FIG. 1 illustrates an example block diagram of a system for performing deblocking on pre-compressed visual data according to some implementations.

FIG. 1 illustrates an example block diagram of a system 100 for performing deblocking on pre-compressed visual data according to some implementations. For instance, an image 102, such as one image of a video sequence, may be received by a pre-processor 104, to process the image 102 in a manner to improve compressibility by the encoder or video encoder 106. In some cases, the pre-processing of the original image 102 by the pre-processor 104 may introduce imperceptible irregularities (e.g., data not noticeable or detectable by the human eye) along the edge of the block, particularly when block based pre-processing is performed. In conventional systems, these imperceptible irregularities may introduce additional data to be compressed, encoded, or otherwise processed by the encoder 106 reducing an overall achievable compression ratio and increasing the overall bandwidth usage of transmitting the image 102 or the video sequence associated with the image 102.

In this example, unlike conventional systems, the pre-processor 104 may generate a plurality of planes 108 representative of shifted versions of the original image 102 and perform the pre-processing on each of the individual planes 108. While the pre-processing of each plane 108 by the pre-processor 104 may introduce imperceptible irregularities along the boundary of blocks of each plane 108, the planes 108 may be shifted with respect to the original image such that each pixel (or in other cases, each interior pixel) of the original image 102 is an interior pixel of at least one block of at least one plane 108. Thus, mitigating the effect of the imperceptible irregularities introduced along the boundary of each block with respect to at least one copy of the pixel from the original image 102.

The planes 108 are then provided to a deblocking unit 110. The deblocking unit 110 combines the plurality of planes 108 back into a single pre-processed and deblocked image 112. In general, the deblocking unit 110 may select a pixel position corresponding to a pixel of the original image 102 and utilize the pixels of at least one block of at least one plane 108 to generate the pixel of the pre-processed and deblocked image 112 at the pixel position. For example, the deblocking unit 112 may identify each of the blocks within one of the planes 108 at which the pixel position exists and weight each pixel based on a distance from the center of the corresponding block. Thus, the closer a pixel is to a boundary of the corresponding block the less weight the pixel is given by the deblocking unit 110. As such, the pre-processed and deblocked image 112 generated by the deblocking unit 110 contains image data that is least likely to experience edge effects during pre-processing, thus, reducing the effect that the imperceptible irregularities has on compression by encoder 106.

For instance, in one implementation, the deblocking unit 110 may determine a weight associated with a pixel of a block based on a pixel's position relative to the center of the block, as pixels near the center of a block contain more accurate estimates than pixels near the edges of the block. Thus, the pixels that are near the center of the block are assigned a higher weight. In some examples, a sum of the weights across all blocks having a pixel at a corresponding pixel position may be equal to 1.0. For instance, if N different planes 108 are used, the final pixel weight of a pixel at a selected position in the deblocked image 112 is calculated by summing the weighted pixels at the selected position for each plane 108. For example, if the planes 108 are represented as $P_1$ to $P_n$, (i, j) are used to represent a position of each pixel within the original image 102, and $w_n$ represents the weight based on the distance from the center of a block, then the deblocked image 112 may be expressed as P'(i, j) and generated from the planes 108 as follows:

$$P'(i, j) = \sum_{n=1...N} w_n(i, j) * P_n(i, j)$$

Once, the encoder 106 receives the pre-processed and deblocked image 112, the encoder 106 may compress the pre-processed and deblocked image 112 and generate a compressed image or date 114. The compressed image 114 may then be transmitted, for example, to a decoder for display to a user.

Figure 2:
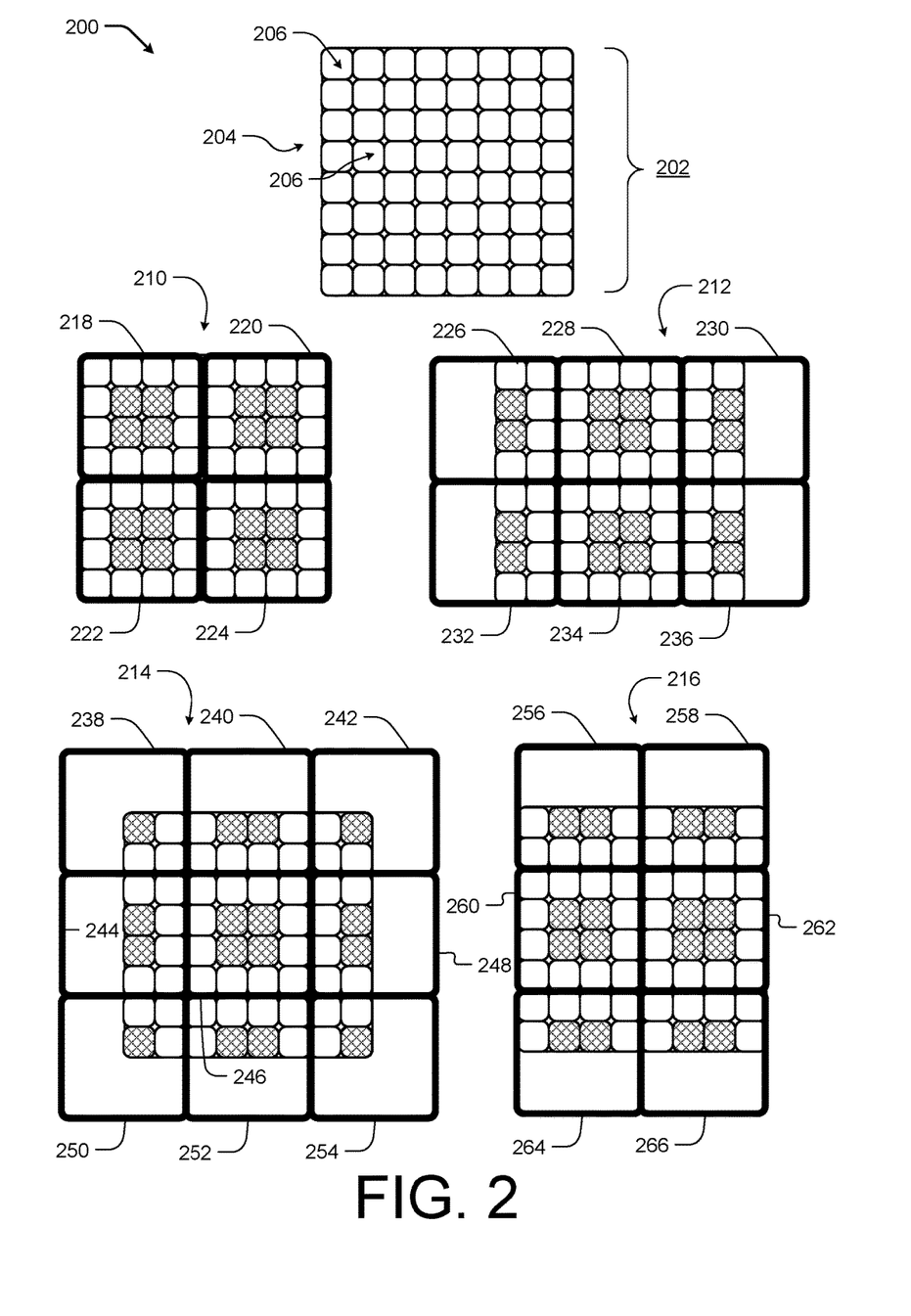
FIG. 2 illustrates an example graphical representation of deblocking planes generated with respect to an original image according to some implementations.

FIG. 2 illustrates an example graphical representation 200 of deblocking planes generated with respect to an original image 202 having pixels 204 according to some implementations. In the current example, the pixels 204 may be referred to with respect to a position offset from a pixel 206 at position (0,0). Thus, the pixel 208 may have a position of (1,4) (e.g., one pixel to the right of the pixel 206 and four pixels below the pixel 206).

In the current example, planes, such as planes 210, 212, 214, and 216, may be generated by a pre-processor. During the pre-processing the planes 210-216 may be processed according to blocks, such as the illustrated blocks 218-268. For instance, in the illustrated example, the plane 210 may include blocks 218-224, the plane 212 may include the blocks 226-236, the plane 214 may include the blocks 238-254, and the plane 216 may include blocks 256-266. Thus, as illustrated, the pre-processor may generate the planes 210-216 such that each pixel 204 of the original image 202 are interior pixels of at least one block of at least one block of one of the planes 210-216, as shown via the shading of the pixels 204 within the planes 210-216. In the current example, the planes are not illustrated with padding. However, if padding was used to extend the boundary of the original image 202 prior to processing by the pre-processor, each of the shaded pixels within a plane would correspond to an interior pixel of at least one block 218-266. In this example, a deblocked image (not shown) may be formed by using only interior pixels of the block 218-266 to further reduce the effect of the imperceptible irregularities on the compression rates associated with the original image 202. In other examples, the pixels 204 may be weighted based on a distance from the edge of a block 218-266 containing the pixel being weighted. The pixels may then be used to form the deblocked image based on the weight assigned.

Figure 3:
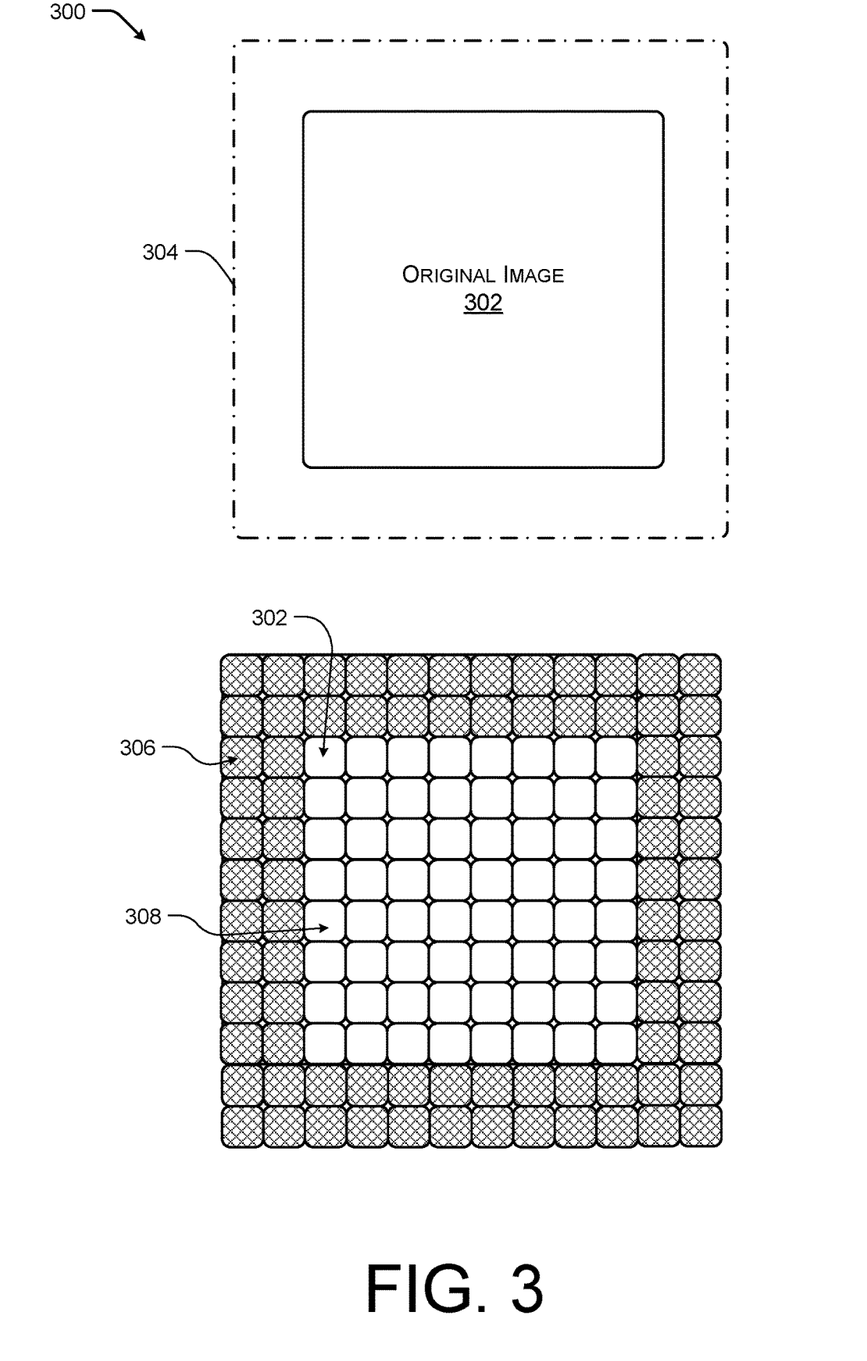
FIG. 3 illustrates an example graphical representation of an original image with padding to accommodate shifting of the original image with respect to generation of one or more planes according to some implementations.

FIG. 3 illustrates an example graphical representation 300 of an original image 302 with padding, generally indicated by dashed line 304, to accommodate shifting of the original image with respect to generation of one or more planes according to some implementations. For example, the pre-processor or other image processing component may be configured to extend the border or edges of the image 302 by mirroring or adding pixel, such as shaded pixels 306, around the exterior of the image pixels, such as pixels 308. In this manner, each pixel 308 of the original image may be an interior pixel of at least one block of at least one plane as will be discussed in more detail below with respect to FIG. 4.

Figure 4:
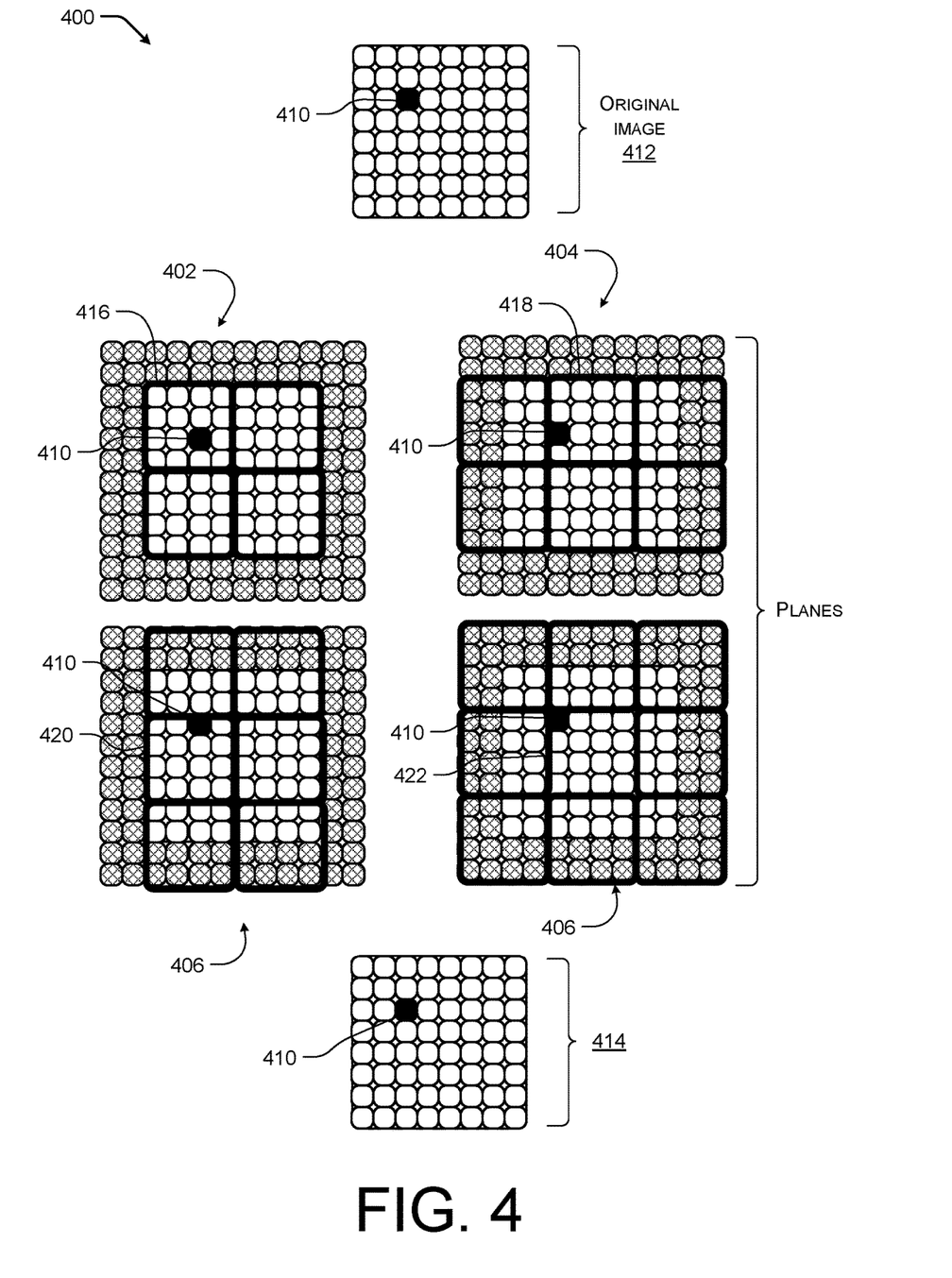
FIG. 4 illustrates another example graphical representation of deblocking planes generated with respect to an original image according to some implementations.

FIG. 4 illustrates another example graphical representation 400 of deblocking planes 402-408 generated with respect to padded version of the original image 302 of FIG. 3 according to some implementations. In this example, the graphical representation 400 illustrates a pixel 410 of an original image 412 within each of the deblocking planes 402-408 and a deblocked image 414. In the current illustration, the pixel 410 is within a different block of each of the planes 402-408. For example, within plane 402, the pixel 410 is within the block 416, within plane 404, the pixel 410 is within the block 418, within plane 406, the pixel 410 is within the block 420, and within plane 402, the pixel 410 is within the block 422. However, the pixel 410 is in the same position in each plane 402-408 with respect to the (0,0) pixel 424 of the original image 412 (e.g., the pixel 410 in each plane 402-408 is at a position (3,3) or three pixels to the right of pixel 424 and three pixels below the pixel 424).

In general, when the deblocking unit selects, weights, and combines the image data from each of the planes 402-408 to generate the deblocked image 414, the deblocking unit identifies each plane 402-408 having a pixel at a select position of the original image 412 and weights each of the identified pixels based on a distance from the center of the corresponding block, such as blocks 416-422. For instance, in the current example, the pixel 410 is nearer the center of the block 416 than the pixel 410 within the blocks 418, 420, and 422. Thus the data from the plane 402 associated with the pixel 410 may have a higher weight than the corresponding pixel 410 within the planes 404-408, and thus will contribute more data to the pixel 410 within the deblocked image 412. Similarly, the pixel 410 within planes 404-408 will have a lower weight than the pixel 410 within plane 402 and, thus, will contribute less image data to the deblocked image 412 with respect to pixel 410.

Additionally, in this example, the pixels of the planes 402-408 extend beyond the edge of the original image 412 in each case. In this manner, the edge pixels, such as pixel 424 at (0,0), may be an interior pixel of at least one of the blocks (e.g., in this example block 426 of plane 408). In some cases, the pre-processor may generate the additional pixels of the planes 402-08 by padding, mirroring, or extending the original image 412 prior to performing additional pre-processing operations on each plane 402-408.

Figure 5:
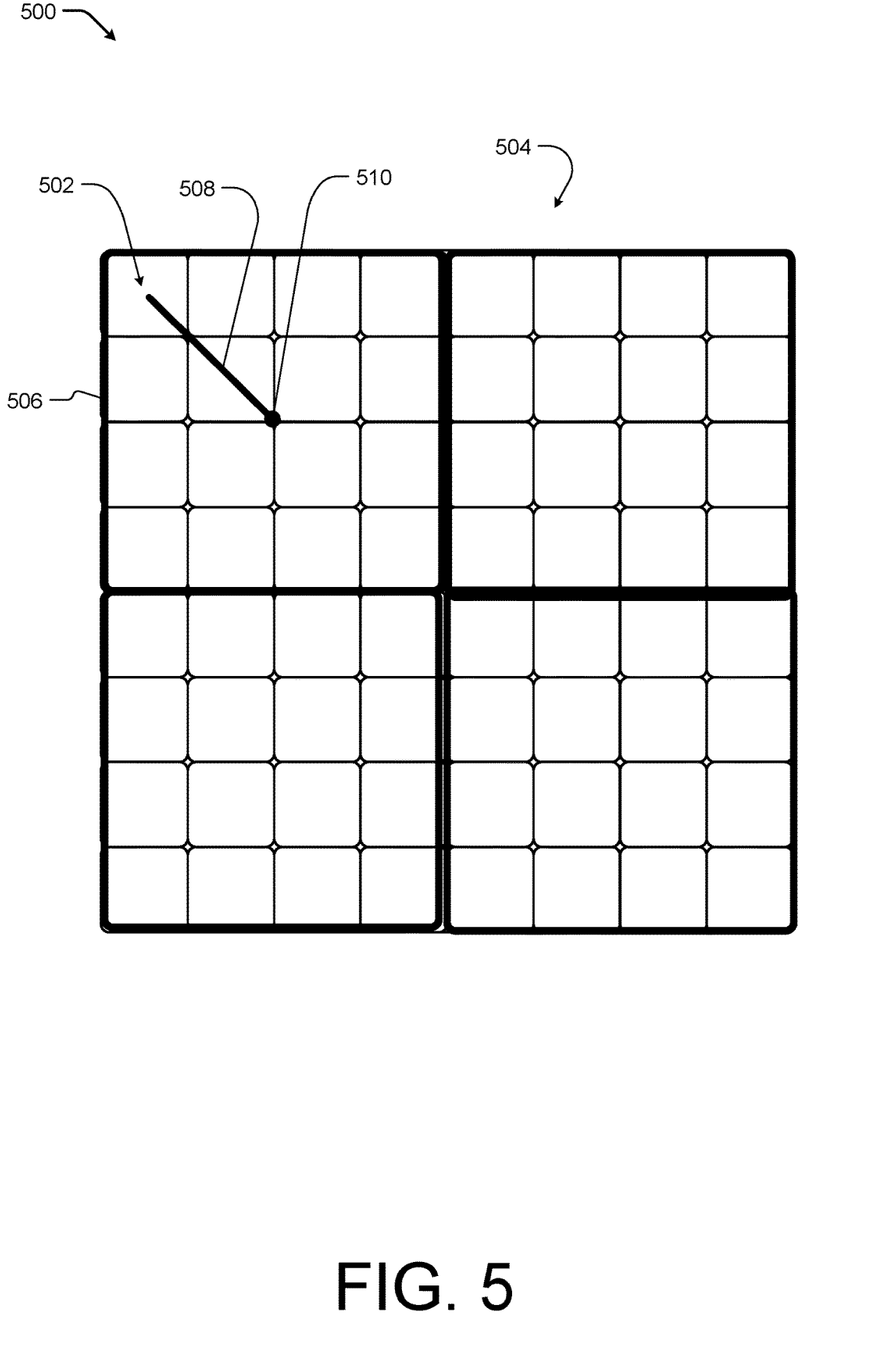
FIG. 5 illustrates an example graphical representation of weighting a pixel within a block of a deblocking plane according to some implementations.

FIG. 5 illustrates an example graphical representation 500 of weighting a pixel 502 within a block 506 of a deblocking plane 504 according to some implementations In this example, weights may be assigned to individual pixels within a block, such as block 506 based on a distance, such as a distance 508, between the individual pixel 502 and a center of the block 510. In this example, the weight of a pixel may be calculated as:

$$w(i,j)=(B2-d)/B2$$

where $w(i, j)$ is the weight of a pixel at position $(i, j)$, $d$ is the distance, and B2 is half the preprocessor block size (or plane size). Thus, in the current example, the weight of the pixel 502 is being determined using the distance 508.

Figure 6:
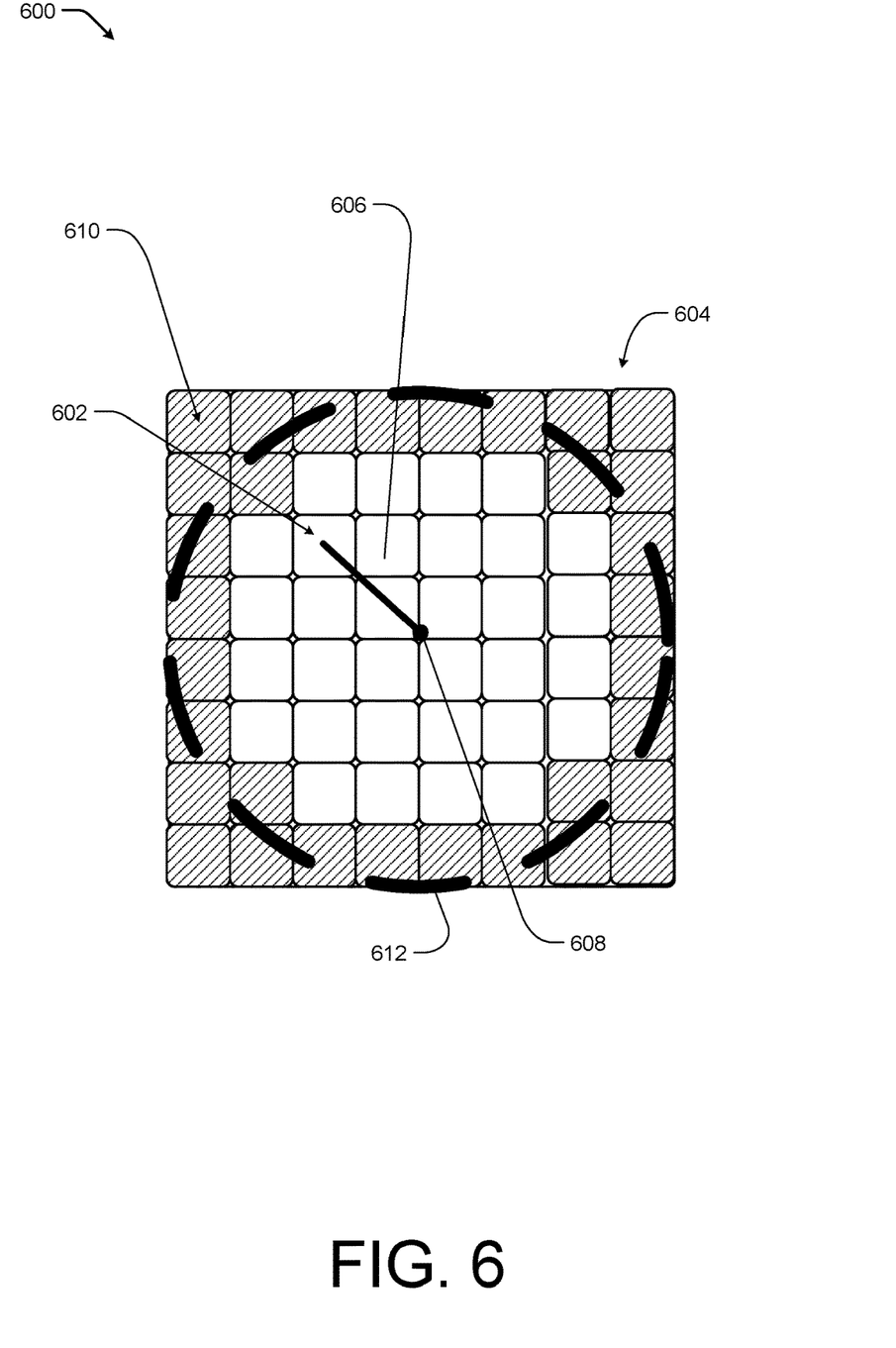
FIG. 6 another illustrates an example graphical representation of weighting a pixel within a block of a deblocking plane according to some implementations.

FIG. 6 illustrates another example graphical representation 600 of weighting a pixel 602 within a block 604 of a deblocking plane according to some implementations. For instance, in the illustrated example, a block 604 of the plane is shown. In this example, the block 604 is a block having a size of an eight by eight. In this example, the weights may be assigned to individual pixels within the block 604 based on a distance, such as a distance 606, between the individual pixel 602 and a center 608 of the block 604. Similar to the weighting discussed above, the weight of a pixel may be calculated as:

$$w(i,j)=(B2-d)/B2$$

where $w(i, j)$ is the weight of a pixel at position $(i, j)$, $d$ is the distance, and B2 is half the preprocessor block size (or plane size). Thus, in the current example, the weight of the pixel 602 is being determined using the distance 606.

In the current example, by using the equation above to weight the pixels of the deblocking plane 604, the pixels along the edge, generally indicated by shaded pixels 610, may be less than zero. In the case, a pixel has a value of less than zero, the weight may be set to zero. In the current example, the pixels 610 having a weight of zero are the pixels that fall along or outside of the line 612.

Figure 7:
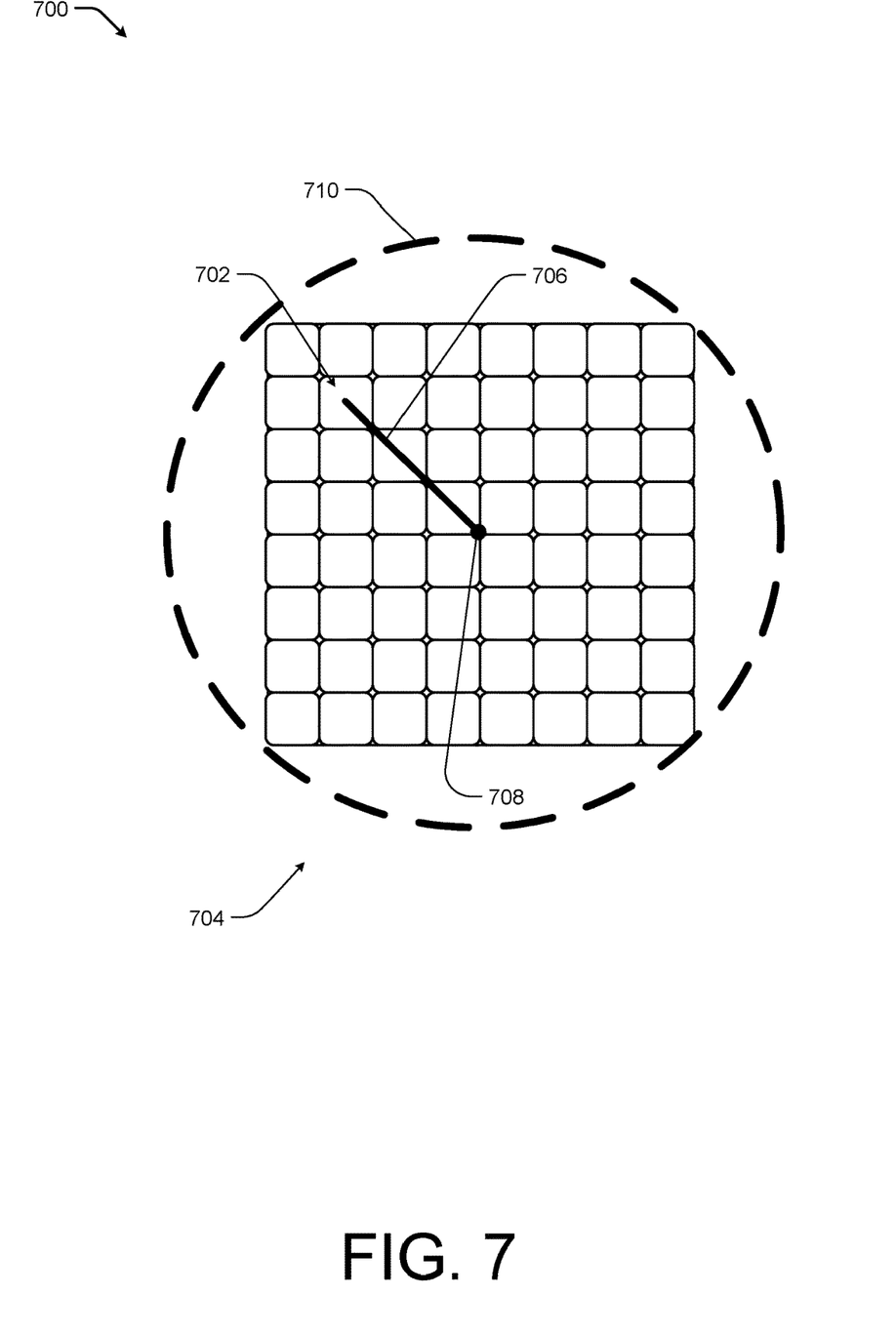
FIG. 7 illustrates another example graphical representation of weighting a pixel within a block of a deblocking plane according to some implementations.

FIG. 7 illustrates an example graphical representation 700 of weighting a pixel 702 within a block 704 of a deblocking plane according to some implementations. For instance, in the illustrated example, a block 704 of the plane is shown and weights are again assigned to individual pixels of the block 704 based on a distance, such as a distance 706, between the individual pixel and a center 708 of the block 704. However, in this example, the weight of a pixel may be calculated as:

$$w(i,j)=(R2-d)/R2$$

$$R2=B2*\sqrt{2.0}$$

where $w(i, j)$ is the weight of a pixel at position $(i, j)$, $d$ is the distance, and R2 is the distance from the corner to the center of the block 704 times the square root of two. Thus, the corner pixels of a plane will have the lowest weight. In the current example, the weight of the pixel 702 is being determined using the distance 706. In this example, the weights are greater than zero as the zero condition is shown by line 710.

FIGS. 6 and 7 illustrate two examples weights that may be used by a deblocking unit to generate a deblocked image from a plurality of planes. However, it should be understood that other weighting metrics may be used. For example, the weight of a pixel may be determined to be proportional to the cosine of the distance from the edge of the block 704 rather than being linearly related to the distance from the center 708. For example, the weight may be calculated as follows:

$$w(i,j)=\cos((\pi/2.0)*(B2-d)/B2)$$

In another example, the weight of a pixel may be determined to be proportional to the cosine of the distance from the corner of a block as follows:

$$w(i,j)=\cos((\pi\cdot 2.0)*(R2-d)/R2)$$

In another example, only the middle pixels in the center of each block may be used to generated the deblocked image. In this case, each additional pixel may be ignored or assigned a weight of 0.0. For instance, in one particular example, using a block size of eight by eight only the four center pixels may be used from each plane when generating a deblocked image.

In yet another example, each plane may be given an equal weight or set to a value of 1/K where K is the number of planes. It should be understood that additional weighting techniques may be utilized by the deblocking unit to merge or combine image data on a pixel by pixel level. In each case, the weight of corresponding pixels across the planes may be summed to a value of one.

Figure 8:
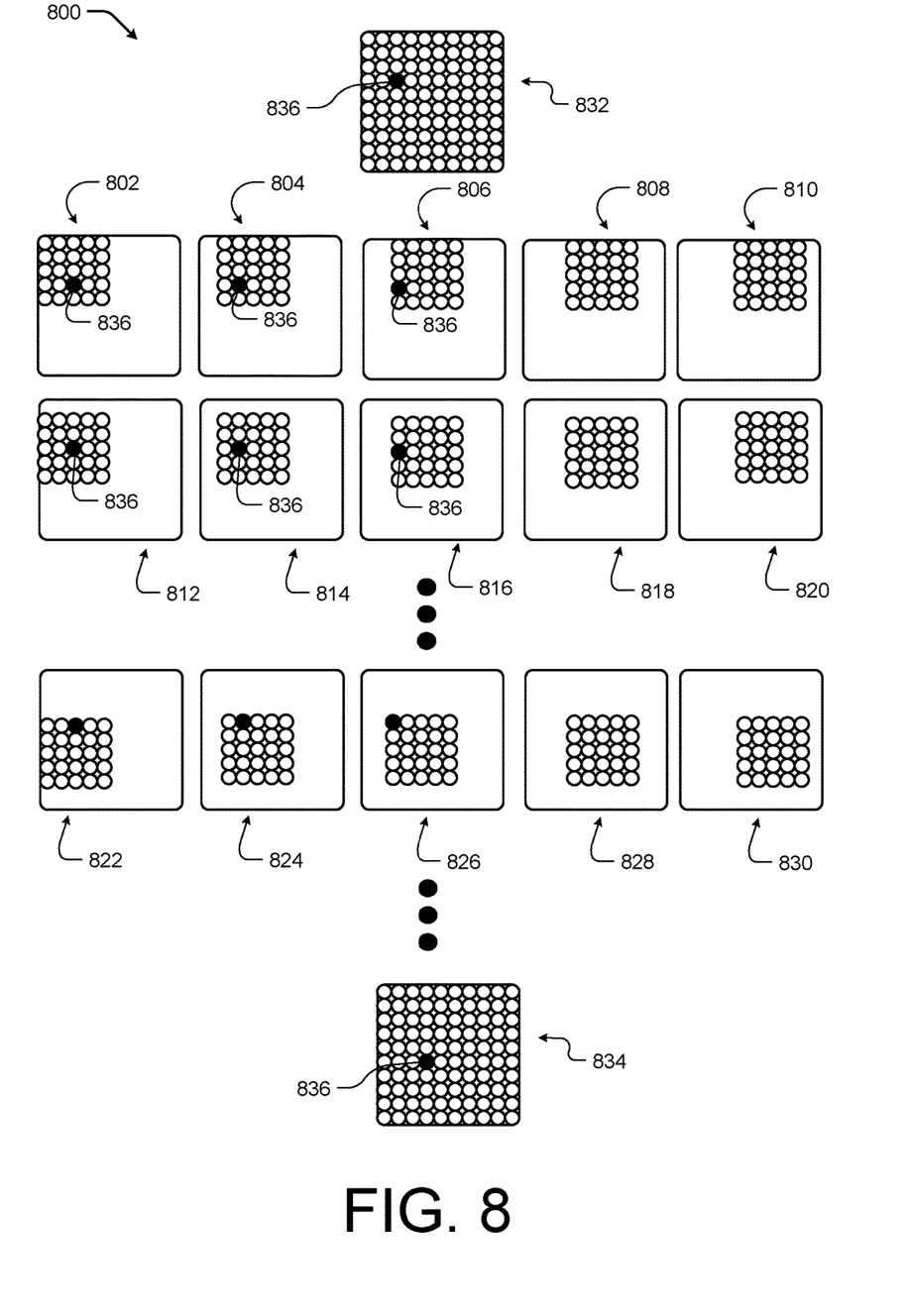
FIG. 8 illustrates yet another example graphical representation of weighting a pixel within a block of a deblocking plane according to some implementations.

FIG. 8 illustrates an example graphical representation 800 of deblocking planes 802-830 generated with respect to an original image 832 and a deblocked image 834 according to some implementations. In this example, the planes 802-834 may include blocks having a five by five size having a starting positioned shifted by one pixel for each plane 802-830. In the current illustration, the highlighted pixel 836 is shown in the original image 832, the deblocked image 834, and planes 802-830 with respect to a shifted block within the planes.

Figure 9:
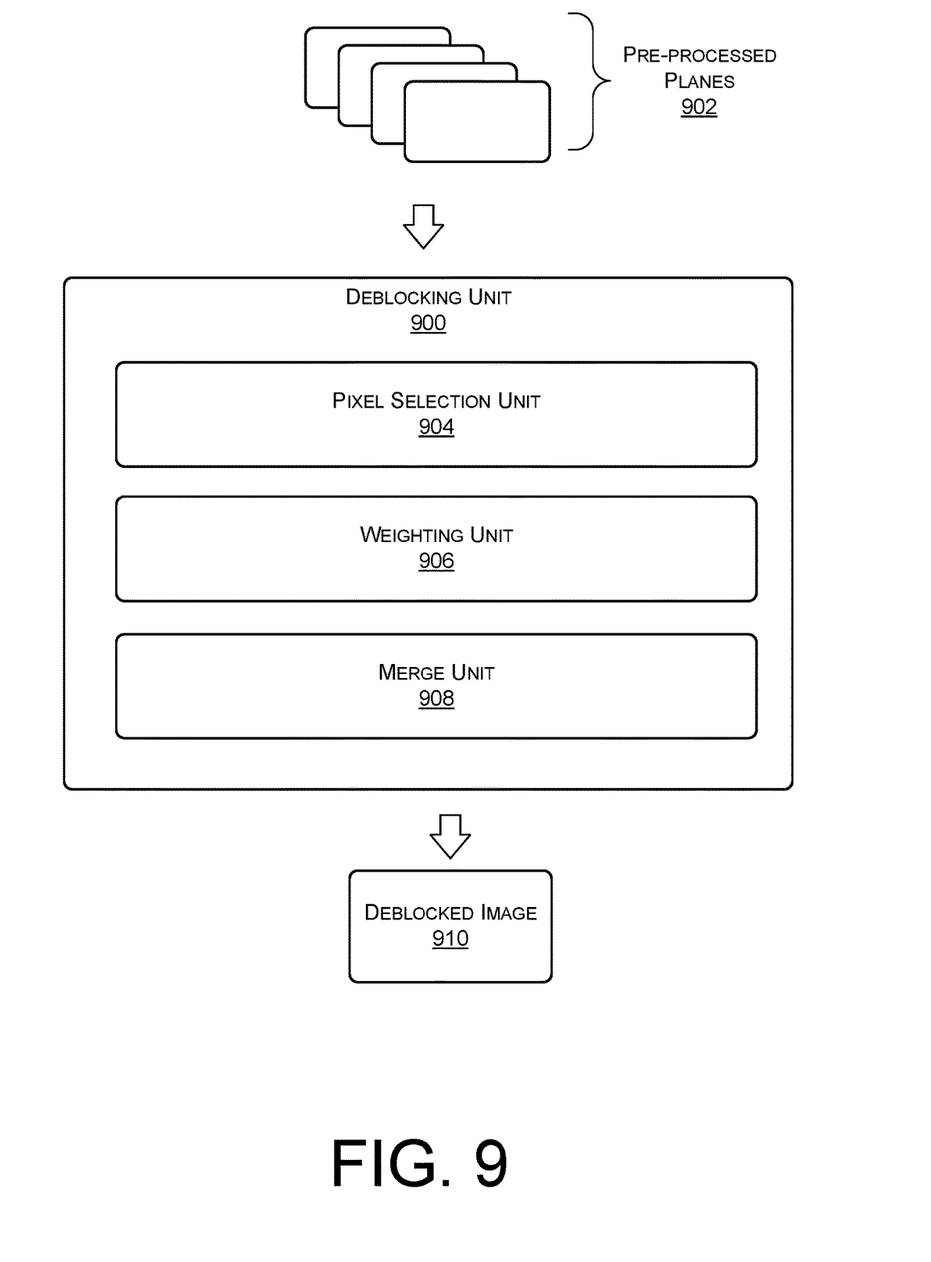
FIG. 9 illustrates an example a deblocking unit for deblocking pre-processed planes according to some implementations.

FIG. 9 illustrates an example a deblocking unit 900 for deblocking pre-processed planes 902 according to some implementations. For instance, in the current example, a pre-processor (not shown) may have generated the plurality of planes 902 with respect to an original image to improve the overall compression rate with respect to the original image, as discussed above. Each of the planes may represent a portion of the original image data after the pre-processing operations are performed. For example, each of the planes 902 may be a shifted representation of the original image with additional pixels added as padding to accommodate the shifting. In other cases, the planes 902 may have less image data or be of a smaller size than the original image. Further, a size of amount of data or position of the blocks within each plane 902 associated with the original image may vary.

The deblocking unit 900 may include several modules or components, such as a pixel selection unit 904, a pixel weighting unit 906, and a merge unit 908. For example, the pixel selection unit 904 may be configured to select a current pixel to process and identify each plane 902 that has image data associated with the selected pixel.

The pixel weighting unit 906 may be configured to determine a weight to assign to corresponding pixels within each plane 902 contributing image data to a particular pixel of the daglocked image 910. For instance, as discussed above, weights are assigned to individual pixels of the planes 902 based on a distance between the pixel selected by the pixel selecting unit and a center of a corresponding block within a plane 902. In one example, the weight of a pixel may be calculated as:

$$w(i,j)=(B2-d)/B2$$

where w(i, j) is the weight of a pixel at position (i, j), d is the distance, and B2 is half the preprocessor block size. In another example, weights may be calculated as:

$$w(i,j)=(R2-d)/R2$$

$$R2=B2*\sqrt{2.0}$$

where w(i, j) is the weight of a pixel at position (i, j), d is the distance, and R2 is the distance from the corner to the center of the corresponding block times the square root of two. In other examples, the weight of a pixel may be determined to be proportional to the cosine of the distance from the edge of the corresponding plane 902 rather than being linearly related to the distance from the center. For instance, the weight may be calculated as follows:

$$w(i,j)=\cos((\pi/2.0)*(B2-d)/B2)$$

In other cases, the weight of a pixel may be determined to be proportional to the cosine of the distance from the corner of a block as follows:

$$w(i,j)=\cos((\pi\cdot 2.0)*(R2-d)/R2)$$

In yet other examples, only the middle pixels in the center of each block may be used to generated the deblocked image or pixels of each plane 902 may be given an equal weight, such as set to a value of 1/K where K is the number of planes 902.

The merger unit 908 may be configured to merge the image data of the pixels from each plane 902 corresponding to the pixel selected by the pixel selecting unit 904 according to the weight applied. For example, if the planes 902 are represented as $P_1$ to $P_n$, (i, j) are used to represent a position of each pixel within the original image, and $w_n(i, j)$ represents the weight of the pixel at the position (i, j), then the deblocked image 910 may be expressed as P'(i, j) and generated by the merge unit 908 from the pixels of the planes 902 as follows:

$$P'(i, j) = \sum_{n=1...N} w_n(i, j) * P_n(i, j)$$

Figure 10:
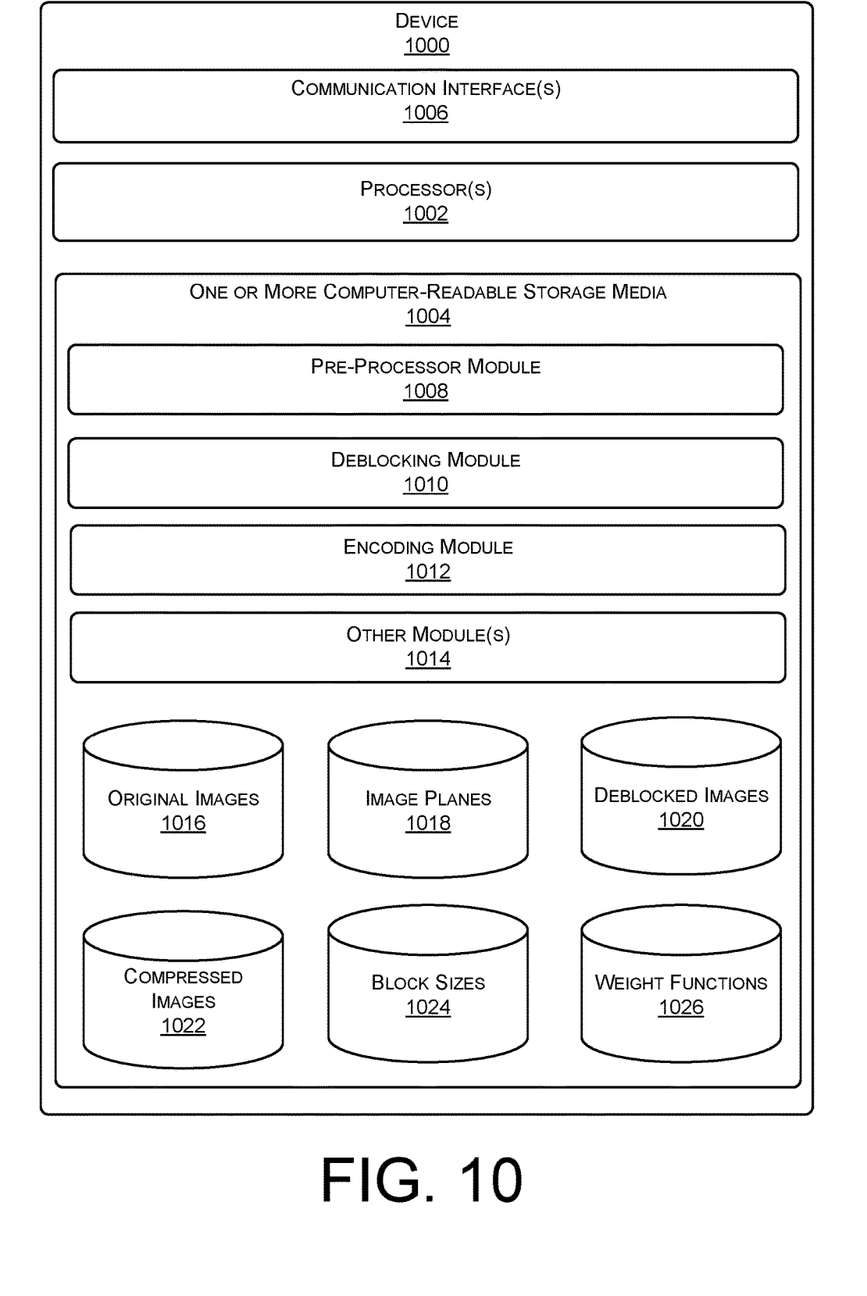
FIG. 10 illustrates example components an electronic device that may be configured to perform deblocking on an image prior to encoding according to some implementations

FIG. 10 illustrates example components an electronic device 1000 that may be configured to perform deblocking on an image prior to encoding according to some implementations. For example, electronic device 1000 may include processing resources, as represented by processors 1002, and computer-readable storage media 1004. The computer-readable storage media 1004 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

The electronic device 1000 may also include one or more communication interfaces 1006, which may support both wired and wireless connection to various networks, such as cellular networks, radio (e.g., radio-frequency identification RFID), WiFi networks, short-range or near-field networks (e.g., Bluetooth®), infrared signals, local area networks, wide area networks, the Internet, and so forth. For example, the communication interfaces 1006 may allow the electronic device 1000 to send or stream compressed video or image data over one or more networks, such as the Internet®.

Several modules, sets of instructions, data stores, and so forth may be stored within the computer-readable media 1004 and configured to execute on the processors 1002. For example, a pre-processing module 1008, a deblocking module 1010, and an encoding module 1012, as well as other modules 1014. In some implementations, the computer-readable media 1004 may store data, such as input images or original image 1016, image planes 1018, deblocked images 1020, compressed images 1022, block sizes 1024, and weighting functions 1026.

The pre-processing module 1008 may generate a plurality of image planes 1018 representative of an original image 1016 and perform the pre-processing on each of the individual planes 1018. While the pre-processing of each plane 1018 by the pre-processing module 1008 may introduce imperceptible irregularities along the boundary of each block, the planes 1018 and/or blocks within each plane 1018 may be shifted with respect to the original image 1016 such that each pixel (or in other cases, each interior pixel) of the original image 1016 is an interior pixel of at least one block of at least one plane 1018. Thus, mitigating the effect of the imperceptible irregularities introduced along the boundary of each block with respect to at least one copy of the pixel from the original image 1016.

The deblocking module 1010 may receive a plurality of planes 1018 representative of the original image 1016 and merge image data of one or more of the plurality of planes 1018 back into a single pre-processed and deblocked image 1024. In general, the deblocking module 1010 may select a pixel position corresponding to a pixel of the original image 1016 and utilize the pixels of at least one block of at least one plane 1018 to generate the pixel of the pre-processed and deblocked image 1020 at the pixel position. For example, the deblocking module 1010 may identify each of the planes 1018 at which the pixel position exists and weight each pixel based on a distance from the center of the corresponding plane 1018 and a weighting function 1026. Thus, the closer a pixel is to a boundary of the corresponding plane 1018 the less weight the pixel is given by the deblocking module 1010. As such, the pre-processed and deblocked image 1020 generated by the deblocking module 1010 contains image data that is least likely to experience edge effects during pre-processing, thus, reducing the effect that the imperceptible irregularities has on compression by encoder module 1012.

For instance, in one implementation, the deblocking module 1010 may determine a weight associated with a pixel of a plane 1018 based on a weighting function 1026 associated with a distance from the center of a block. For example, the pixels that are near the center of a block may be assigned a higher weight than the pixel near the edge of the block.

In some implementations, the deblocking module 1010 may sum of the weights across all planes 1018 corresponding to a single pixel position may be equal to 1.0. For instance, if N different planes 1018 are used, the final pixel weight of a pixel at a select positon in the deblocked image 1020 is calculated by summing the weighted pixels at the select position for each plane 1018. For example, if the planes 1018 are represented as $P_1$ to $P_n$, (i, j) are used to represent a position of each pixel within the original image 102, and $w_n$ represents the weight, then the deblocked image 1020 may be expressed as P'(i, j) and generated from the planes 1018 as follows:

$$P'(i, j) = \sum_{n=1...N} w_n(i, j) * P_n(i, j)$$

The encoder module 1012 receives the pre-processed and deblocked image 1020, and compress the pre-processed and deblocked image 1020 and generate a compressed image or date 1022. The compressed image 1022 may then be transmitted, for example, to a decoder for display to a user by the communication interface 1006.

Figure 11:
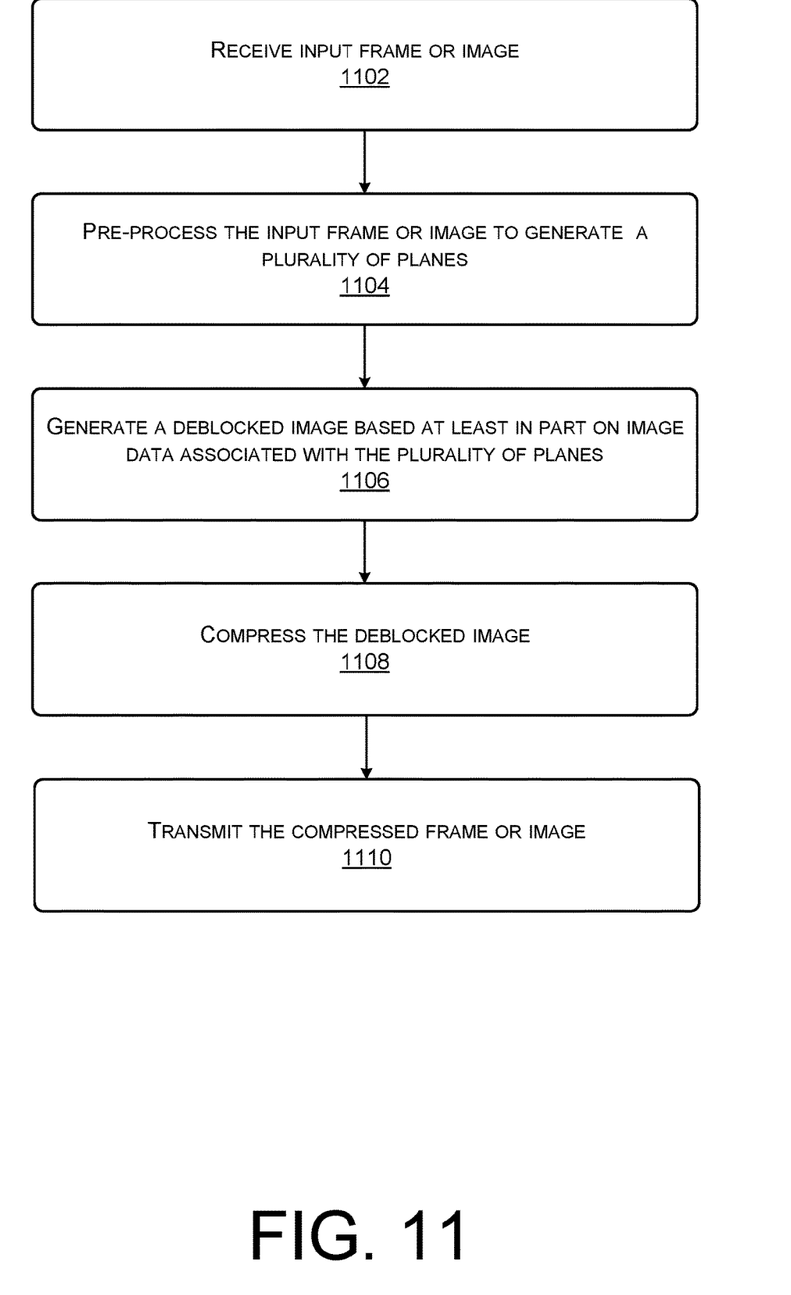
FIG. 11 is an example flow diagram showing an illustrative process for deblocking an image prior to encoding according to some implementations.

FIG. 11 is a flow diagram illustrating example processes associated with deblocking pre-processed image data prior to compression by an encoder according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 11 is an example flow diagram showing an illustrative process 1100 for deblocking an image prior to encoding according to some implementations. For instance, image data is often pre-processed prior to compressing by a video encoder to improve the compression rate of the image data when compared with a non-processed image. However, many conventional systems utilize block based pre-processing systems that introduce imperceptible irregularities (e.g., data not noticeable or detectable by the human eye) along the edge of the blocks. The pre-processed image data including the imperceptible irregularities are then encoded and transmitted to a receiver (such as a set-top-box). Unfortunately, in the conventional system, the encoding of the imperceptible irregularities results in a reduction in the overall compression of the image data, increasing bandwidth usage, and overall costs associated with transmitting data. Thus, described herein, is a process 1100 to remove the imperceptible irregularities from pre-processed image data by deblocking a plurality of copies or planes of the pre-processed data.

At 1102, a pre-processing system may receive an input frame or image to be transmitted in a compressed format. For example, the pre-processing system may receive a frame from a video sequence being streamed to a set-top-box or other electronic device as part of a video streaming service.

At 1104, the pre-processing system may pre-process the input frame or image to generate a plurality of planes. For example, the pre-processing system may generate a plurality of image planes representative of the frame or image received and perform the pre-processing on each of the individual planes. While the pre-processing of each plane may introduce imperceptible irregularities along the boundary of each block, the planes and/or blocks may be shifted with respect to the original frame or image such that each pixel (or in other cases, each interior pixel) of the original frame or image is an interior pixel of at least one block of at least one plane. Thus, mitigating the effect of the imperceptible irregularities introduced along the boundary of each block with respect to at least one copy of the pixel from the original frame or image.

At 1104, the pre-processing system may generate a deblocked image based at least in part on image data associated with the plurality of planes. For example, the pre-processing system may receive a plurality of planes representative of the original frame or image. Each of the planes having been pre-processed for compression. The pre-processing system may merge image data of one or more of the plurality of planes back into a single pre-processed and deblocked image. In general, the pre-processing system may select a pixel position corresponding to a pixel of the original image or frame and utilize the pixels of at least one block of at least one plane to generate the pixel of the pre-processed and deblocked image at the pixel position. For example, the pre-processing system may identify each of the planes at which the pixel position exists and weight each pixel based on a distance from the center of a corresponding block and a weighting function. Thus, the closer a pixel is to a boundary of the corresponding block the less weight the pixel is given by the pre-processing system during deblocking. As such, the pre-processed and deblocked image generated by the pre-processing system may contains image data that is least likely to experience edge effects during pre-processing, thus, reducing the effect that the imperceptible irregularities has on compression rates associated with the image data.

At 1108, the pre-processing system may compress the deblocked image and, at 1110, the pre-processing system may transmit the compressed frame or image. For example, the deblocked image may be compressed and transmitted via one or more networks.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
   receiving an image;
   generating a predetermined number of planes from the image by applying a plurality of offsets to the image, each of the one or more planes including a portion of the image;
   generating a plurality of blocks from each plane wherein each pixel of the image is an interior pixel of at least one block of the plurality of blocks;
   performing at least one pre-processing operation on each of the one or more planes, the at least one pre-processing operation to improve a compression rate associated with the image data;
   generating, following the completion of the at least one pre-processing operation on each of the one or more planes, a deblocked image from the interior pixels based at least in part on applying a weight a first pixel of a first block of the plurality of blocks, the weight determined based at least in part on a distance of the first pixel from an edge of the first block;
   encoding the deblocked image to generate a compressed image; and
   transmitting the compressed image.

2. The method as recited in claim 1, wherein generating the deblocked image includes applying at least one deblocking filter to the one or more planes.

3. The method as recited in claim 1, wherein generating the deblocked image includes applying a second weight to the first pixel of the first block of the plurality of blocks, the second weight determined based at least in part on a distance of the first pixel from a center of a plane associated with the first block.

4. The method as recited in claim 1, wherein generating the deblocked image includes generating the deblocked image from data associated with pixels position proximate to a center of each of the one or more planes.

5. The method as recited in claim 1, wherein:
   generating the deblocked image includes weighting pixels of individual ones of the one or more planes; and
   a sum of the weight of the pixels at a given position relative to the image within the individual ones of the one or more planes is equal to one.

6. The method as recited in claim 1, wherein a number of the plurality of offsets is equal to the predetermined number of planes.

7. The method as recited in claim 1, wherein a size of a plane of the plurality of frames is based at least in part on the size of the frame and a corresponding one of the plurality of offset.

8. The method as recited in claim 1, further comprising adding at least one pixel to a first block of the plurality of blocks to extend the a boundary of the block.

9. The method as recited in claim 1, wherein each of the one or more planes includes same data from the image.

10. One or more non-transitory computer-readable media having computer-executable instructions which, when executed by one or more processors, cause the one or more processors to perform operations comprising:
    generating one or more planes from original image data, an individual one of the plurality of planes configured to include a portion of the original image data by shifting individual ones of the one or more of planes with respect to the original image data;
    generating a plurality of blocks from each plane, wherein each pixel of the image is an interior pixel of at least one block of the plurality of blocks;
    performing at least one pre-processing operation on at least one of the one or more of planes, the at least one pre-processing operation to improve a compression rate associated with the original image data;
    generating deblocked image data from data associated with each of the one or more of planes based at least in part by applying a weight to at least one pixel of the individual one of the one or more of planes, the weight is based on a distance of the at least one pixel from a center of a block associated with at least one of the one or more of planes;
    compressing the deblocked image data to generate compressed image data; and
    transmitting the compressed image data.

11. The one or more non-transitory computer-readable media as recited in claim 10, wherein the data associated with each of the one or more of planes includes interior pixels of the plurality of blocks.

12. A system comprising:
an unit, the pre unit to:
generate a first plane associated with original image data, wherein the first plane includes a first plurality of pixels corresponding to a first set of pixels of the original image data and individual pixels of the first plurality of pixels have a weight based at least in part on a distance from the center of the first plane;
generate a second plane associated with original image data, wherein the second plane includes a second plurality of pixels corresponding to second set of pixels of the original image data and individual pixels of the second plurality of pixels have a weight based at least in part on a distance from the center of the second plane;
generating a first plurality of blocks from the first plane and a second plurality of block from the second plane, wherein each pixel of the original image data is an interior pixel of at least one of the plurality of blocks or the second plurality of blocks; and
generate a deblocked image from the interior pixels based at least in part on the weights;
an encoder to compress the deblocked image; and
a communication interface to send the compressed image.

13. The system as recited in claim 12, wherein the unit is a pre-processor.

14. The system as recited in claim 12, wherein:
the unit generates a third plane and a fourth plane, the third plane includes a third portion of the original image data and the fourth plane includes a fourth portion of the original image data; and
the deblocked image includes data from the third plane and the fourth plane.

15. The system as recited in claim 12, wherein the first set of pixels is different than the second set of pixels.

16. The system as recited in claim 12, wherein the first set of pixels includes at least one pixel of the second set of pixels.

17. The system as recited in claim 12,
wherein a first pixel of the first plurality of pixels has a first weight, a second pixel of the second plurality of pixels has a second weight, the first pixel and the second pixel having a corresponding position relative to the original image data; and
wherein generating the deblocked image includes generating a third pixel of the deblocked image based at least in part on the first pixel, the second pixel, the first weight, and the second weight.

18. The dimensional processor as recited in claim 17, wherein a fourth pixel of the first plurality of pixels has a third weight, a fifth pixel of the second plurality of pixels has a fourth weight, the third pixel and the fourth pixel having a corresponding position relative to the original image data; and
wherein generating the deblocked image includes generating a sixth pixel of the deblocked image based at least in part on the fourth pixel, the fifth pixel, the third weight, and the fourth weight.

19. The system as recited in claim 12, wherein at least one pixel of the first set of first plurality of pixels does differs from the original image data and at least one pixel of the second plurality of pixels differs from the original image data.

20. The system as recited in claim 12, wherein generating the first plurality of blocks includes applying an offset in the X and Y direction from a corner of the first plane for each of the plurality of blocks.

* * * * *